United States Patent
Zou et al.

(10) Patent No.: US 9,825,954 B2
(45) Date of Patent: Nov. 21, 2017

(54) STATEFUL USER DEVICE IDENTIFICATION AND BINDING FOR CLOUD APPLICATION SECURITY

(71) Applicant: Holonet Security, Inc., San Jose, CA (US)

(72) Inventors: Feng Zou, San Jose, CA (US); Chunqing Cheng, San Jose, CA (US); Sheng Li, Beijing (CN); Ying Xiong, San Jose, CA (US)

(73) Assignee: Holonet Security, Inc., San Jose, CA (US)

( * ) Notice: Subject to any disclaimer, the term of this patent is extended or adjusted under 35 U.S.C. 154(b) by 361 days.

(21) Appl. No.: 14/743,830

(22) Filed: Jun. 18, 2015

(65) Prior Publication Data

US 2016/0352735 A1    Dec. 1, 2016

Related U.S. Application Data

(60) Provisional application No. 62/166,631, filed on May 26, 2015.

(51) Int. Cl.
| | |
|---|---|
| *G06F 7/04* | (2006.01) |
| *H04L 29/06* | (2006.01) |
| *H04L 29/08* | (2006.01) |
| *H04L 12/66* | (2006.01) |
| *H04L 29/12* | (2006.01) |

(52) U.S. Cl.
CPC ............. *H04L 63/10* (2013.01); *H04L 12/66* (2013.01); *H04L 61/2514* (2013.01); *H04L 63/029* (2013.01); *H04L 67/10* (2013.01)

(58) Field of Classification Search
CPC .... H04L 63/10; H04L 61/2514; G04L 63/029
USPC ............................................................ 726/7
See application file for complete search history.

(56) References Cited

U.S. PATENT DOCUMENTS

| | | | |
|---|---|---|---|
| 8,280,058 B2* | 10/2012 | Conway | H04L 63/02 370/235 |
| 2005/0015765 A1* | 1/2005 | Covell | H04L 29/06 718/100 |
| 2005/0193191 A1* | 9/2005 | Sturgis | H04L 63/0435 713/155 |
| 2008/0242264 A1* | 10/2008 | Malik | G06F 21/31 455/411 |
| 2011/0185055 A1* | 7/2011 | Nappier | H04L 63/08 709/224 |

(Continued)

*Primary Examiner* — Teshome Hailu
(74) *Attorney, Agent, or Firm* — Perkins Coie LLP; Alberto Araiza; Viola T. Kung

(57) ABSTRACT

At least one embodiment relates to a method and a system for cloud application visibility of network traffic. The method includes: receiving, from a network gateway, hardware identity extracted from network session traffic for accessing cloud-based application services, wherein the hardware identities correspond to user devices that initiate the network session traffic; receiving, from an application processing engine, user credentials decoded from the network session traffic, wherein the user credentials authorize the network session traffic to access the cloud-based application services; and matching the hardware identities with the user credential to identify a user who uses multiple user devices or multiple user credentials to access the cloud-based application services.

18 Claims, 5 Drawing Sheets

(56) References Cited

U.S. PATENT DOCUMENTS

2013/0042323 A1\* 2/2013 Narayanaswamy ...... H04L 63/1408
  726/23
2016/0275303 A1\* 9/2016 Narayanaswamy ...... G06F 21/6218

\* cited by examiner

300

| Source IP Address 310 | Source Port Number 320 | Destination IP Address 330 | Destination Port Number 340 | Protocol Identification 350 |
|---|---|---|---|---|
| 192.168.1.112 | 282 | 67.82.121.32 | 283 | TCP |

*FIG. 3*

STATEFUL USER DEVICE IDENTIFICATION AND BINDING FOR CLOUD APPLICATION SECURITY

CROSS-REFERENCE TO RELATED APPLICATIONS

This application claims the benefit of U.S. Provisional Patent Application No. 62/166,631, filed May 26, 2015, which is incorporated by reference herein in its entirety.

FIELD OF THE INVENTION

This invention relates to cloud application security, and particularly relates to stateful user device identification and binding for cloud application security.

BACKGROUND OF THE INVENTION

Local Area Network (LAN) is a basic information technology (IT) infrastructure that has been widely deployed on campuses by all sizes of companies, from as tiny as home offices to as large as blue-chip corporation giants. With many companies distributing their workforces in different locations, the capability of securely connecting LANs among offices in these locations has been a luxury for middle-size or larger enterprises due to the complexity and cost of deploying infrastructures achieving such functionalities. Some companies use Virtual Private Network (VPN) technology to securely connect an enterprise's headquarter (HQ) with its branch offices.

In addition, companies start to move enterprise-level services to cloud computing platforms that are outside of the internal networks of the companies. Although companies still use technologies such as virtual private network (VPN) to benefit from the security of a private network, the role of the networking devices (e.g., firewall devices) starts to shift in consideration of the outside cloud services.

Furthermore, there is a trend for companies to allow employees to use their own devices to work. Such a policy is called bring-your-own-device (BYOD). The company allows the employees to use the BYOD devices to connect to the company network and access privileged corporation information, applications and services.

The BYOD devices and external servers bring new challenges to the firewall system. First, although it is common that each of the corporation devices is registered and therefore identifiable to the firewall system, BYOD devices are rarely registered. It is a challenge for the firewall system to identify the user who uses a BYOD device to access an external service. Second, with increasing popularity of cloud-based online services, it is common that a cloud-based online service has both corporation users and personal users. As a result, it is a challenge for the firewall system to determine whether an access request from a device inside of the company network to access an external server is for a personal purpose or for business purpose benefiting the corporation.

SUMMARY OF THE INVENTION

The present invention is directed to a method for cloud application visibility of network traffic. The method includes: receiving, from a network gateway, hardware identity extracted from network session traffic for accessing cloud-based application services, wherein the hardware identities correspond to user devices that initiate the network session traffic; receiving, from an application processing engine, user credentials decoded from the network session traffic, wherein the user credentials authorize the network session traffic to access the cloud-based application services; and matching the hardware identities with the user credential to identify a user who uses multiple user devices or multiple user credentials to access the cloud-based application services.

The present invention is also directed to an analytic engine for generating stateful information regarding a network user's activities using multiple user devices or multiple user credentials. The analytic engine comprises a networking interface and a stateful analysis module. The networking interface module is for receiving, from a network gateway, metadata including Media Access Control (MAC) addresses associated with network session traffic directed by the network gateway, and further for receiving, from an application processing engine, additional metadata including user credentials associated with the network session traffic. The stateful analysis module is for linking the MAC addresses and the user credentials by identifying that a user of an individual user credential uses two or more user devices corresponding to two or more of the MAC addresses, or that two of the user credentials use a common user device corresponding to one of the MAC address and the two or more user credentials are associated with a common user.

The present invention is also directed to a system for cloud visibility. The system comprises a network gateway, an application processing engine, and an analytic engine. The network gateway is for receiving network session traffic from a first user device, the network gateway extracting a first hardware identity of the first user device from the network session traffic, wherein the first user device sends the network session traffic to access a first cloud-based application service. The application processing engine is for receiving the network session traffic from the network gateway, the application processing engine decoding the network session traffic and extracting a first user credential and an identity of the first cloud-based application service from the network session traffic. The analytic engine is for receiving from the network gateway a first message including the first hardware identity of the first user device and a first tuple information of the network session traffic, and receiving from the application processing engine a second message including the first user credential and the identity of the first cloud-based application service and the first tuple information of the network session traffic. The analytic engine matches the first tuple information from both the first and second messages and creates an entry in a first stateful record database identifying that a user of said first user credential uses said first user device of said first hardware identity to access said first cloud-based application service.

BRIEF DESCRIPTION OF THE DRAWINGS

FIG. 3 illustrates a table listing tuple information of a network session traffic.

DETAILED DESCRIPTION OF THE INVENTION

Figure 1:
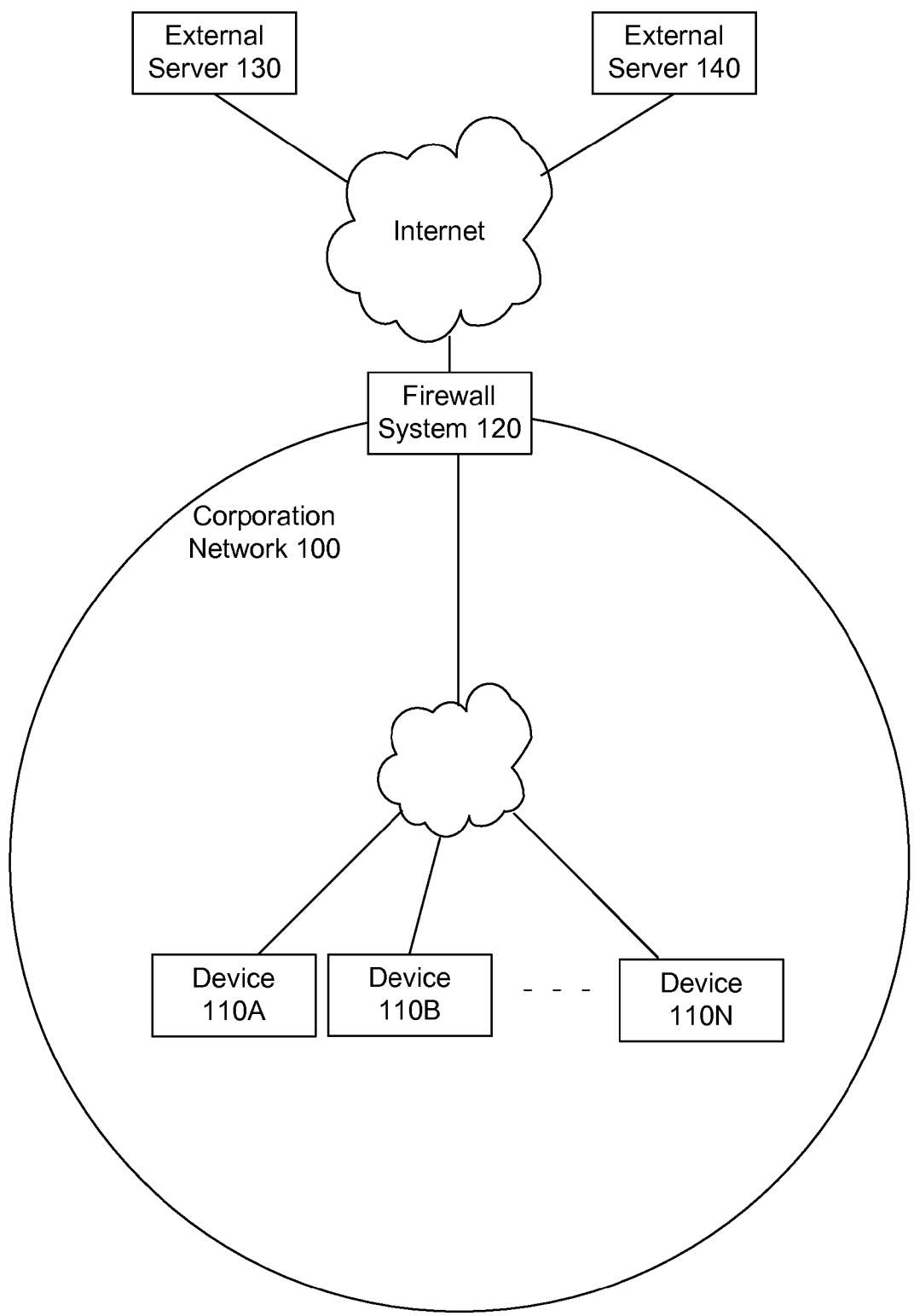
FIG. 1 illustrates a networking environment of a corporation.

FIG. 1 illustrates a networking environment of a corporation, according to various embodiments. There is a corporation network 100 for interconnecting devices of the corporation. The corporation network 100 can be, e.g., a local area network (LAN) or a virtual private network (VPN) extends a private network for the corporation across a public network (e.g., the Internet). The corporation network 100 includes multiple computing devices 110A-110N interconnected by the corporation network 100. The corporation network 100 further includes a firewall system 120 that controls the incoming and outgoing network traffic based on the network rules set by the corporation. The computing devices 110-110N can include servers that run applications capable of accepting certain requests from client devices and giving responses accordingly.

While the corporation network 100 can still retain some of the servers within the network 100, some of the services can be provided by external servers or cloud servers outside of the corporation network 100. For example, FIG. 1 illustrates an external server 130 for cloud-based data storage service (e.g., Box or Dropbox) and an external server 140 for cloud-based customer relationship management service (e.g., Salesforce). The computing devices 110A-110N inside of the corporation network 100 can access the external servers 130 and 140 through the firewall system 120.

The computing devices 110A-110N inside of the corporation network 100 can include devices that are owned by the corporation (referred to as "corporation devices" or "company devices"), as well as bring-your-own-device (BYOD) devices. BYOD devices refer to devices that the employees personally own and bring to the workplace. The corporation can set a policy allowing the employees to use BYOD devices to connect to the corporation network 100 and access privileged corporation information, applications and services. For example, a single employee may use both a corporation device 110A (e.g., a company computer) and a BYOD device 110B (e.g., a personal smart phone) to access the external servers 130 and 140.

The BYOD devices and external servers bring new challenges to the firewall system 120. First, although it is common that each of the corporation devices is registered and therefore identifiable to the firewall system 120, BYOD devices are rarely registered. It is a challenge for the firewall system 120 to identify the user who uses a BYOD device to access an external server. Second, with increasing popularity of cloud-based online services, it is common that a cloud-based online service has both corporation users and personal users. As a result, it is a challenge for the firewall system 120 to determine whether an access request from a device inside of the corporation network 100 to access an external server is for a personal purpose or for business purpose benefiting the corporation. In summary, it is a challenge for the firewall system 120 to monitor various information such as who is accessing outside services, from which device does the internal user access outside services, when does the internal user access outside services, which outside service does the internal user access, and what activity does the internal user perform.

Figure 2:
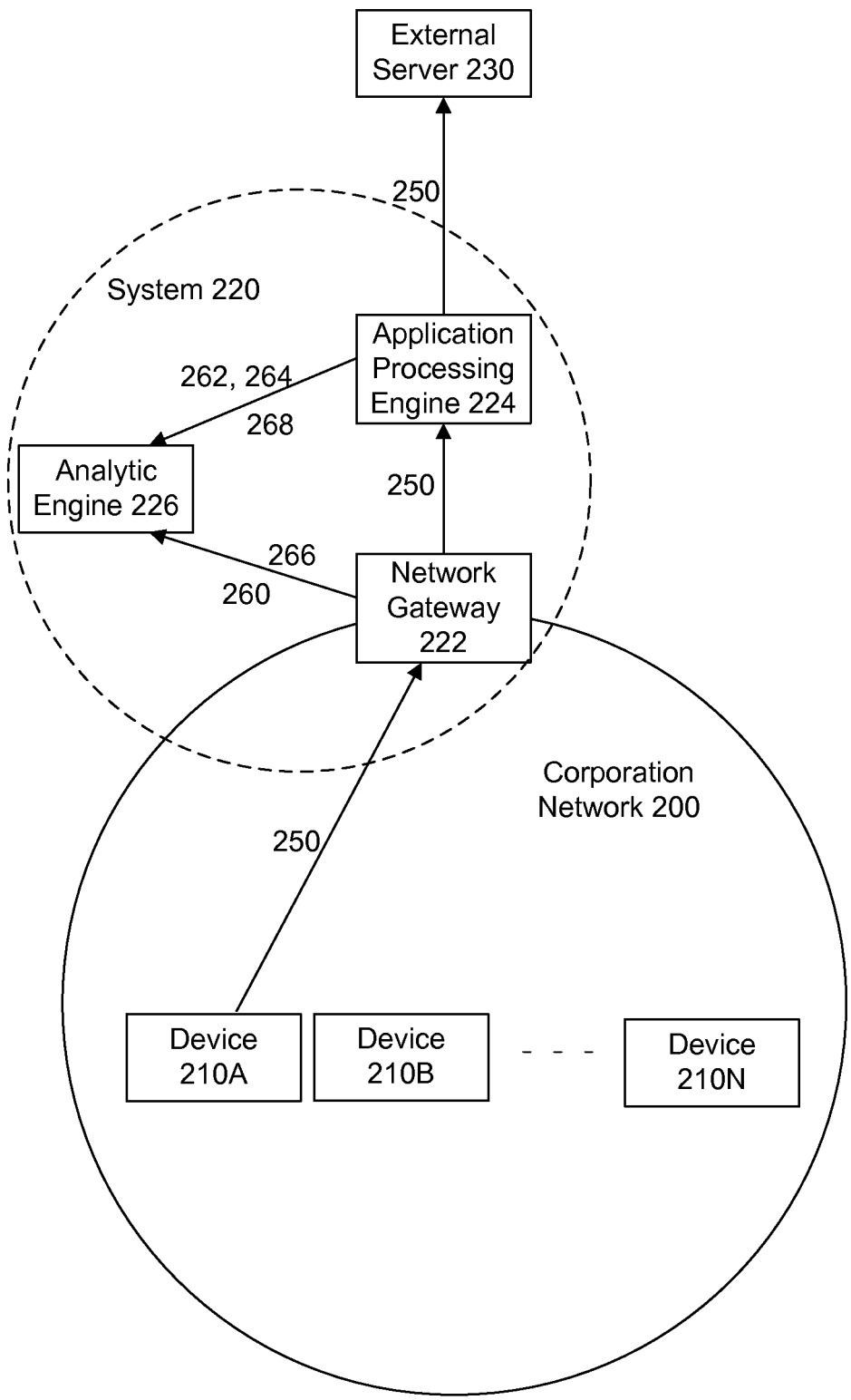
FIG. 2 illustrates a system for cloud visibility in a networking environment.

FIG. 2 illustrates a system for cloud visibility in a networking environment, according to various embodiments of the disclosure. The system 220 can monitor the network traffics and record stateful user device identification. For example, the system 220 is able to identify multiple devices that a single user uses to access external services. Alternatively, the system 220 is able to identify multiple users that use the same device to access various external services. In some embodiments, the system 220 is referred to as U-DID system.

The system 220 includes a network gateway 222, an application processing engine 224 and an analytic engine 226. The network gateway 222 is a device controlling the incoming and outgoing network traffics through the corporation network 200. For example, in some embodiments, the network gateway 222 can be, e.g., a hardware networking device within the corporation network 200 (an internal network) that directs network traffic from devices of the corporation network 200 to cloud-based application services outside of the corporation network 200.

The corporation network 200 includes multiple user devices 210A-210N. The user devices 210A-210N include corporation devices, as well as BYOD devices. For example, the network gateway 222 receives network session traffic 250 from a user device 210A. The user device 210A sends the network session traffic 250 to the network gateway 222 in order to access a cloud-based application service running on an external server 230. The network gateway 222 then extracts a hardware identity 260 of the user device 210A from the network session traffic 250. Although FIG. 2 uses the corporation network 200 as an illustrating example, a person having ordinary skill in the art will readily appreciate that the technology disclosed herein can be applied without undue experiment to other type of network, such as an internal or private network for an entity, an origination, a government agency, a family, a business, etc.

In some embodiments, the network gateway 222 does not have the decoding information for decoding the network session traffic to retrieve content of the network session traffic 250, such as user credentials or the target cloud-based application services. For example, the network gateway 222 can only access information of the network session traffic 250 at the lowest three layers of the Open Systems Interconnection (OSI) model. The lowest three layers of the OSI model include the physical layer (OSI layer 1), the data link layer (OSI layer 2) and the network layer (OSI layer 3). In other words, the network gateway 222 can access the Media Access Control (MAC) address (part of the data link layer) or the IP address (part of the network layer). Also, the network session information, e.g., the source and destination port numbers, can be transferred between the network gateway 222, the application processing engine 224 and the analytic engine 226 as ISO layer 4 data. But the network gateway 222 cannot access information related to OSI layer 6 (presentation layer, e.g., MIME—"Multi-Purpose Internet Mail Extensions") or OSI layer 7 (application layer, e.g., HTTP—"Hypertext Transfer Protocol"). In some other embodiments, the network gateway 222 do have the decoding information for decoding the network session traffic.

In some embodiments, the system 220 collects various information or metadata and correlate these information and metadata to analyze the usage patterns. For example, the information or metadata can include data from layer 2 to layer 7, e.g., MAC addresses of all devices connected to the network, network session data (5-tuple) (generated by the network gateway; can include source IP address, destination IP address, source port, destination port, protocol) and application session data (generated by application processing engine; can include application Domain Name System (DNS) name, name, user name, file name, and uniform resource identifier (URI)).

The network gateway 222 and the application processing engine 224 can be two modules that share the same hardware device. The technology disclosed herein supports both the combined mode where the network gateway 222 and the application processing engine 224 run on the same device, as well as the separated mode wherein the network gateway 222 and the application processing engine 224 run on separate hardware devices or platforms. The network session information, e.g., the source and destination port numbers, can be transferred between the network gateway 222, the application processing engine 224 and the analytic engine 226 as ISO layer 4 data.

In some embodiments, the hardware identity 260 of the user device 210A can include, e.g., a Media Access Control (MAC) address of the user device 210A, an Internet Protocol (IP) address assigned to the user device 210A, an IP port number of the user device 210A (e.g., a Transmission Control Protocol (TCP) or User Datagram Protocol (UDP) port number), a domain name assigned to the user device 210A, or a combination thereof. The IP address assigned to the user device 210A can be, e.g., a public IP address that uniquely identifies the user device 210A across the Internet, or a private IP address that uniquely identifies the user device 210A among devices within the corporation network 200. In some embodiments, the network gateway 222 prefers to collect MAC address as the hard identity 260 instead of the IP address, because the IP address can change, especially under Dynamic Host Configuration Protocol (DHCP).

After the extraction process, the network gateway 222 sends the extracted hardware identity 260 to the analytic engine 226 (as, e.g., information or metadata), and forwards the network session traffic 250 to the application processing engine 224. The application processing engine 224 decodes the network session traffic 250 and extracts certain content from the network session traffic 250. For example, the application processing engine 224 has the decoding information to access content of network session traffic 250 at OSI layer 6 (presentation layer, e.g., MIME—"Multi-Purpose Internet Mail Extensions") or OSI layer 7 (application layer, e.g., HTTP—"Hypertext Transfer Protocol").

The extract content can include, e.g., a user credential 262 and an identity 264 of the target cloud-based application service (also referred to as "service identity 264") from the network session traffic 250. Then the application processing engine sends the user credential 262 and the identity 264 of the cloud-based application service to the analytic engine 226, and forward the network session traffic 250 to the external server 230.

In some embodiments, the user of the user device 210A uses the user credential 262 to authorize the network session traffic 250 to access the cloud-based application service provided by the external server 230. The user credential 262 can include, e.g., a user name, a user identification number, an email address, or a combination thereof. For example, a user of the user device 210A, John Smith, can include an email address john.smith@gmail.com. The email address john.smith@gmail.com is required for the user to log onto a cloud storage service provided by the external server 230. The analytic engine 226 can use the email address or other type of user credential 262 to identify the user who uses the user device 210A.

The analytic engine 226 receives the hardware identity 260 from the network gateway 222, and the user credential 262 and the service identity 264 from the application processing engine 224. In addition, the network gateway 222 can send a tuple information 266 along with the hardware identity 260 to the analytic engine 226. The application processing engine 224 can further send another tuple information 268, along with the user credential 262 and the service identity 264, to the analytic engine 226. The first and second tuple information are used to identify the network session traffic 250.

In other words, the tuple information 266 identifies the network session traffic 250 from which the hardware identity 260 are extracted; while the tuple information 268 identifies the network session traffic 250 from which the user credential 262 and the service identity 264 are extracted. The analytic engine 226 can match the tuple information 266 and the tuple information 268 to ensure that the hardware identity 260, the user credential 262 and the service identity 264 are extracted from the same network session traffic 250. In other words, the analytic engine 226 binds the hardware identity 260, the user credential 262 and the service identity 264 together. Then the analytic engine 226 creates a new entry in a stateful record database 227 (also referred to as "stateful log"). The new entry includes the identification information indicating that a user of the user credential 262 uses a user device of the hardware identity 260 to access an external service of the service identity 264.

In some embodiments, the tuple information 266 or 268 can include, e.g., a source IP address, a source IP port number, a destination IP address, a destination IP port number, an identification of a network protocol of the network session traffic, or a combination thereof. The combination of the five tuple information is called "network session". For example, FIG. 3 illustrates a table listing tuple information of a network session traffic. The tuple information 300 includes a source IP address 310 of 192.168.1.112, a source port number 320 of 282, a destination IP address 330 of 67.82.121.32, a destination port number 340 of 283, and a protocol identification 350 of TCP. In other words, the network traffic session is sent from TCP port 282 of a device having a private IP address of 192.168.1.112, to TCP port 283 of a server having a public IP address of 67.82.121.32.

In some embodiments, the application processing engine 224 can be, e.g., a cloud service running on a cloud computing platform. The analytic engine 226 can also be, e.g., a cloud service running on another cloud computing platform. In some embodiments, the application processing engine 224 and the analytic engine 226 can be two modules running on a common cloud computing platform. In some other embodiments, the application processing engine 224 and the analytic engine 226 can be two modules running on a common hardware network device deployed within the corporation network 200. The application processing engine 224 and the analytic engine 226 can even share the same hardware device with the network gateway 222. In some alternative embodiments, one of the application processing engine 224 and the analytic engine 226 runs on a cloud computing platform outside of the corporation network 200, while the other runs on a hardware device deployed within the corporation network 200.

In some embodiments, using the elasticity of the cloud computing platform, the system can assign the functionality of the network gateway and the application processing engine dynamically. When the hardware of the network gateway has a light workload, the system may assign some or all of the functionality of the application processing engine to the hardware of the network gateway. In other words, the hardware device inside of the corporation network is responsible for some of all of the functionality of the application processing engine. On the other hand, when the hardware of the network gateway has a heavy workload, the system can offload some or all of the functionality of the application processing engine to a cloud computing platform outside of the corporation network.

The system 220 can process multiple network session traffics (including the network session traffic 250) simultaneously or within a short time frame. For example, the analytic engine 226 can receive from the network gateway 222 additional information or metadata including one or more hardware identities associated with one or more additional network sessions. The analytic engine 226 can further receive from the application processing engine additional information or metadata including one or more user credentials associated with the one or more additional network sessions. Based on the additional information or metadata, the analytic engine can determine that multiple user devices (e.g., including device 210A) are associated with a common user, or that multiple user credentials (e.g., including user credential 262) are associated with a common user.

By creating stateful network information by linking the hardware identities extracted by the network gateway 222 with user credentials extracted by the application processing engine 224, the analytic engine 226 can provide a user visibility service based on the stateful network information. The user visibility service can, e.g., identify multiple user devices and/or multiple user credentials associated with a common user.

For example, the analytic engine 226 receives from the network gateway 222 additional information or metadata including again the hardware identity 260 and a second tuple information of another network session traffic 251 (not shown in the figure). The analytic engine 226 further receives from the application processing engine 224 additional information or metadata including another user credential 263 (not shown in the figure) and another service identity and a matching tuple information of the network session traffic 251. By analyzing the information or metadata related to the network session traffic 251, the analytic engine 226 can determine that a common user is associated with both the user credential 262 and user credential 263, because both the network session traffics 250 and 251 are initiated from the same user device of hard identification 260.

Similarly, in another example, the analytic engine 226 receives from the network gateway 222 additional information or metadata including another hardware identity 261 (not shown in the figure) and a second tuple information of another network session traffic 251. The analytic engine 226 further receives from the application processing engine 224 additional information or metadata including again the same user credential 262 and another service identity and a matching tuple information of the network session traffic 251. By analyzing the information or metadata related to the network session traffic 251, the analytic engine 226 can determine that a common user of the user credential 262 is associated with both the device of hardware identity 260 and the device of hardware identity 261, because both the network session traffics 250 and 251 are initiated from two user devices of hard identifications 260 and 261 by the same user of user credential 262.

Furthermore the analytic engine 226 can provide a user profiling service based on the stateful network information. The user profiling service identifies one or more cloud-based application services that a user device (e.g., device 210A) accesses from the corporation network 200.

With the stateful information collected and analyzed by the analytic engine 226, the system 200 can enforce firewall policy even involving BYOD devices. For example, the system 200 may receive an instruction to implement a policy to block a user, John Smith, from accessing a particular cloud-based storage service. John Smith has a corporation computer. Thus, the system 200 implements a policy to block any network traffic from that corporation computer to the cloud-based storage service. However, John Smith also brings his smart phone, as a BYOD device, to the corporation network. Once John Smith initiates a network session from his smart phone to access the cloud-based storage service, the system 200 collects the log information and metadata from the network session and recognizes that the smart phone belongs to John Smith as well. Accordingly, the system 200 implement an additional policy to block any network traffic from his smart phone to the cloud-based storage service.

Using the stateful information that links John Smith to his corporation computer and his smart phone, the system 200 is able to implement an policy specifically designed for a user John Smith, even when the smart phone is not registered. Without the stateful information, a firewall device has to block all devices to access the cloud-based storage service, or allow John Smith to bypass the policy by using his BYOD device to access the cloud-based storage service. Based on the stateful information, the system is able to correlate the user credentials with the user devices, and enforce network policies based on these stateful information.

Figure 4:
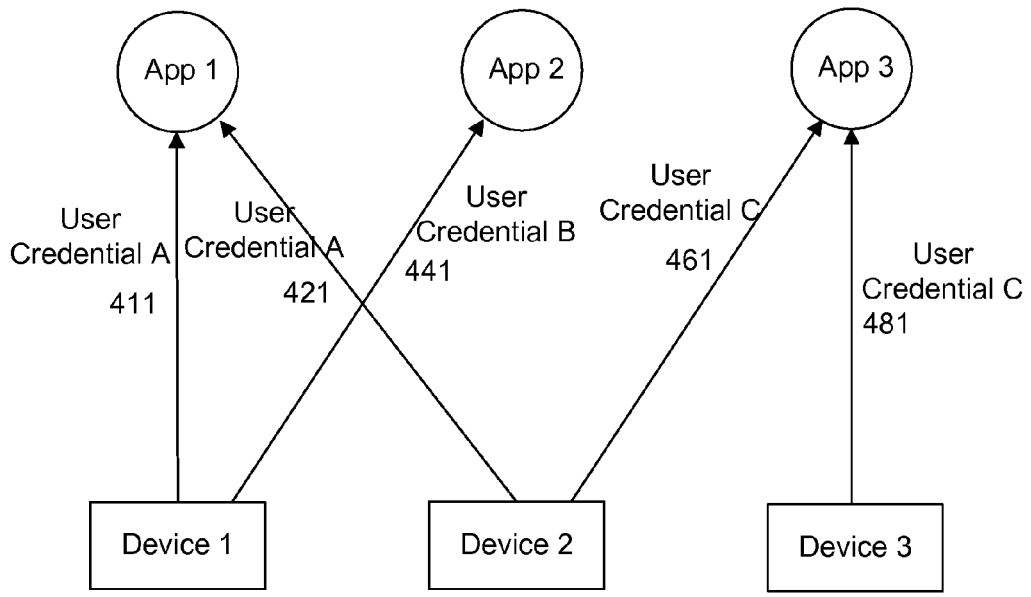
FIG. 4 illustrates a sample process of processing stateful information by an analytic engine
Figure 4:
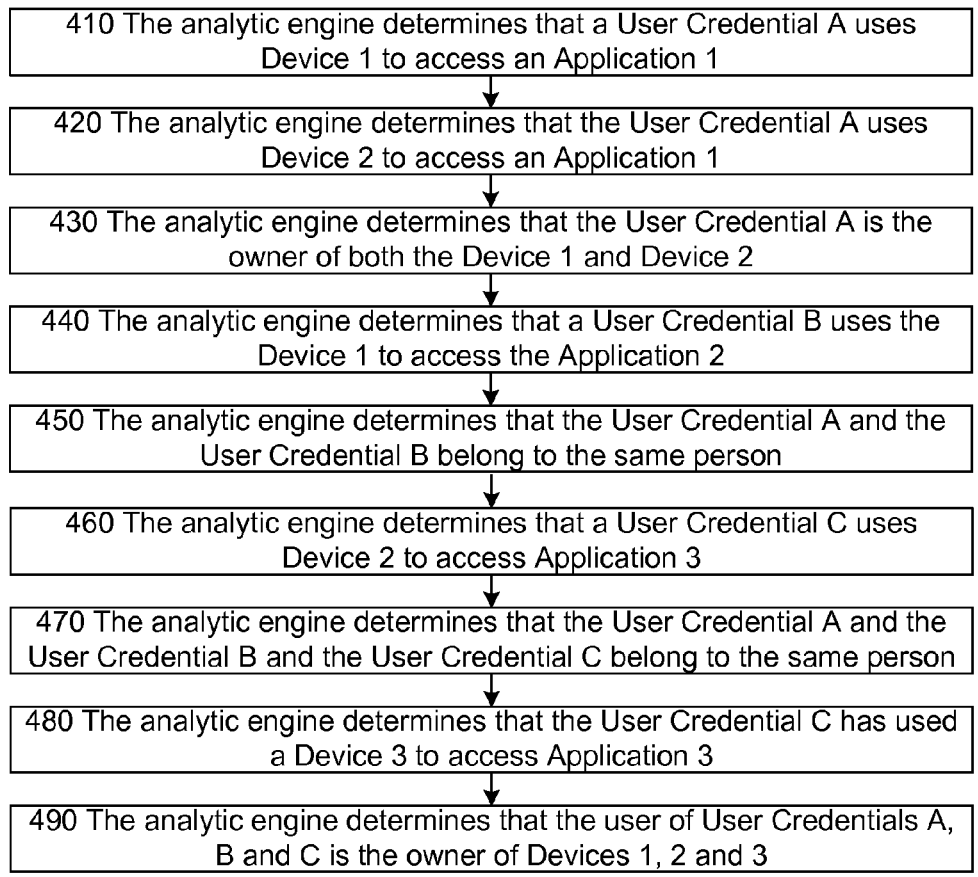

FIG. 4 illustrates a sample process of processing stateful information by an analytic engine, according to various embodiments of the disclosure. At step 410, based on information or metadata from a network session traffic 411 (e.g., hardware identity, user credential, service identity, etc.), the analytic engine determines that a User Credential A uses Device 1 to access an Application 1.

At step 420, based on information or metadata from a network session traffic 421, the analytic engine determines that the User Credential A uses Device 2 to access an Application 1 (e.g. a cloud-based application outside of the corporation network 200). At step 430, based on the stateful information collected from steps 410 and 420, the analytic engine determines that the User Credential A is the owner of both the Device 1 and Device 2. The reason is that the User Credential A has initiated two separate network sessions from Devices 1 and 2 respectively to access the Application 1.

At step 440, based on information or metadata from a network session traffic 441, the analytic engine determines that a User Credential B uses the Device 1 to access the Application 2. At step 450, based on the stateful information collected from steps 410-440, the analytic engine determines that the User Credential A and the User Credential B belong to the same person, because User Credential A has used Device 1 to access Application 1 and User Credential B has used the same Device 1 to access Application 2.

At step 460, based on information or metadata from a network session traffic 461, the analytic engine determines that a User Credential C uses Device 2 to access Application 3. At step 470, the analytic engine determines that the User Credential A and the User Credential B and the User Credential C belong to the same person, because both User Credential A and User Credential C have used Device 2 to access two different Application 1 and 3.

At step 480, based on information or metadata from a network session traffic 481, the analytic engine determines that the User Credential C has used a Device 3 to access Application 3. At step 490, the analytic engine determines that the user of User Credential C (and User Credentials A and B) is the owner of Device 3 (as well as Devices 1 and 2).

Figure 5:
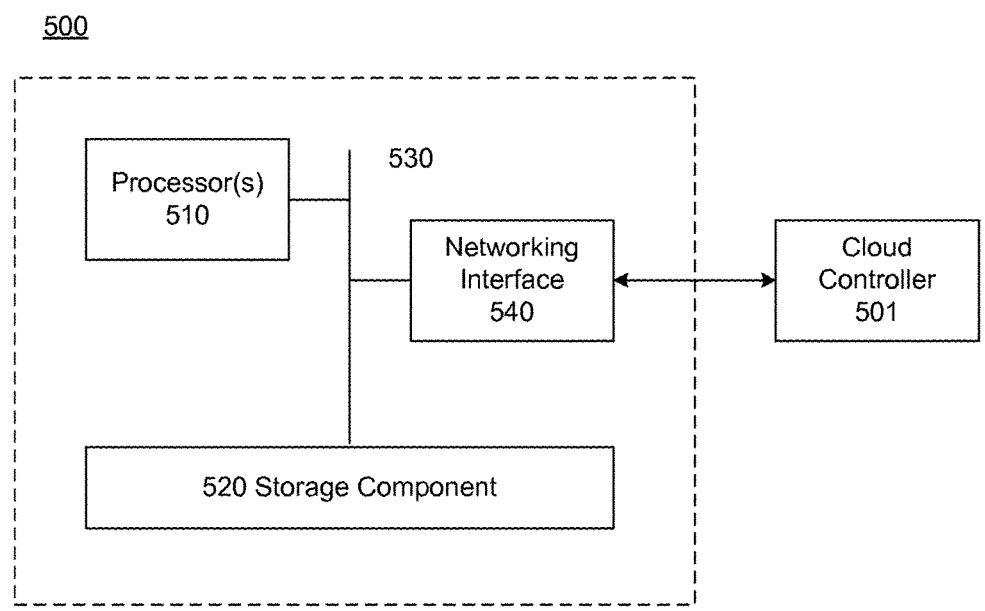
FIG. 5 illustrates an example of a high level architecture of a hardware device that any of the network gateway, the application processing engine and the analytic engine can run.

FIG. 5 illustrates an example of a hardware device 500 that any of the network gateway, the application processing engine and the analytic engine can run. The hardware device 500 includes one or more processors 510, a networking interface 540 and a storage component 520 coupled to an interconnect 530. The interconnect 530 shown in FIG. 5 is an abstraction that represents any one or more separate physical buses, point to point connections, or both connected by appropriate bridges, adapters, or controllers. The interconnect 530, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 510 is/are the central processing unit (CPU) of the storage controller 500 and, thus, control the overall operation of the device 500. In certain embodiments, the processor(s) 510 accomplish this by executing software or firmware stored in memory 520. The processor(s) 510 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The storage component 520 represents any form of random access memory (RAM), read-only memory (ROM), flash memory, or the like, or a combination of such devices. In use, the storage component 520 may contain, among other things, code embodying at least a portion of an operating system of the device 500.

Also connected to the processor(s) 510 through the interconnect 530 are a networking interface 540. The networking interface 540 provides the device 500 with the ability to communicate to other devices over a network and may be, for example, an Ethernet adapter or Fibre Channel adapter. In some embodiments, a device may use more than one networking interface to deal with the communications within and outside of the network device separately.

The code stored in storage component 520 may be implemented as software and/or firmware to program the processor(s) 510 to carry out actions described below. In certain embodiments, such software or firmware may be initially provided to the device 500 by downloading it through the device 500 (e.g., via networking interface 540).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

The invention, and the manner and process of making and using it, are now described in such full, clear, concise and exact terms as to enable any person skilled in the art to which it pertains, to make and use the same. It is to be understood that the foregoing describes preferred embodiments of the present invention and that modifications may be made therein without departing from the scope of the present invention as set forth in the claims. To particularly point out and distinctly claim the subject matter regarded as invention, the following claims conclude this specification.

The invention claimed is:

1. A method for cloud application visibility of network traffic, comprising:
   receiving, from a network gateway, hardware identities extracted from network session traffic for accessing cloud-based application services and tuple information associated with the network session traffic, wherein the hardware identities correspond to user devices that initiate the network session traffic;
   wherein the network gateway receives the network session traffic from the user devices and extracts the hardware identities of the user devices from the network session traffic, forwards the network session traffic to an application processing engine, and the user devices sends the network session traffic to access the cloud-based application services;
   receiving, from an application processing engine, user credentials, identities of the cloud-based application services, and tuple information decoded from the network session traffic, wherein the user credentials authorize the network session traffic to access the cloud-based application services;
   wherein the application processing engine receives the network session traffic from the network gateway, decodes the network session traffic and extracts the user credentials and the identities of the cloud-based application services from the network session traffic, and the application processing engine forwards the network session traffic to the cloud-based application services; and
   matching the tuples information to link the hardware identities with the user credentials to identify a user who uses multiple user devices or multiple user credentials to access one or more of the cloud-based application services, in order to improve cloud application visibility of the network session traffic;
   generating stateful information for a user associated with the multiple user devices or the multiple credentials and the cloud-based application services.

2. The method of claim 1, further comprising:
   providing a user profiling service based on stateful information about the user who uses one or more user credentials to access one or more cloud-based application services from one or more user devices.

3. The method of claim 1, wherein the network gateway does not have the decoding information for decoding the network session traffic to retrieve the user credentials or to identify the cloud-based application services.

4. An analytic engine for generating stateful information regarding a network user's activities using multiple user devices or multiple user credentials, comprising:
- a networking interface module for receiving, from a network gateway, metadata including Media Access Control (MAC) addresses and tuple information associated with network session traffic directed by the network gateway;
- wherein the network gateway receives the network session traffic from user devices and extracts the MAC addresses of the user devices from the network session traffic, forwards the network session traffic to an application processing engine, and the user devices send the network session traffic to access cloud-based application services;
- the networking interface further for receiving, from the application processing engine, additional metadata including user credentials associated with the network session traffic, identities of the cloud-based application services, and tuple information of the network session traffic;
- wherein the application processing engine receives the network session traffic from the network gateway, decodes the network session traffic and extracts the user credentials and the identities of the cloud-based application services from the network session traffic, and the application processing engine forwards the network session traffic to the cloud-based application services; and
- a stateful analysis module for linking the MAC addresses, the tuples information, and the user credentials by identifying that a user of an individual user credential uses two or more user devices corresponding to two or more of the MAC addresses to access a common cloud-based application service or that two of the user credentials use a common user device corresponding to one of the MAC addresses to access different cloud-based application services and the two or more user credentials are associated with a common user;
- wherein the stateful analysis module generates stateful information for a user associated with one or more user devices and one or more user credentials and one or more cloud-based application services;
- wherein the stateful analysis module links the MAC addresses and the user credentials by matching the tuples information extracted from the network session traffic.

5. A system for cloud visibility, comprising:
- a network gateway for receiving network session traffic from a first user device, the network gateway extracting a first hardware identity of the first user device from the network session traffic, wherein the first user device sends the network session traffic to access a first cloud-based application service;
- an application processing engine for receiving the network session traffic from the network gateway, the application processing engine decoding the network session traffic and extracting a first user credential and an identity of the first cloud-based application service from the network session traffic; and
- an analytic engine for receiving from the network gateway a first message including the first hardware identity of the first user device and a first tuple information of the network session traffic, and receiving from the application processing engine a second message including the first user credential and the identity of the first cloud-based application service and the first tuple information of the network session traffic;
- wherein the analytic engine receives from the network gateway a third message including a second hardware identity and a second tuple information of another network session traffic, and receives from the application processing engine a fourth message including the first user credential and the identity of the first cloud-based application service and the second tuple information of the other network session traffic;
- wherein the analytic engine matches the first tuple information from both the first and second messages and creates an entry in a first stateful record database identifying that a user of the first user credential uses the first user device of the first hardware identity to access the first cloud-based application service;
- wherein the analytic engine matches the second tuple information from both the third and fourth messages and creates an entry in a second stateful record database identifying that the user of the first user credential uses a second user device of the second hardware identity to access the first cloud-based application service;
- wherein the analytic engine determines that the user is associated with the first user credential and the first and second user devices.

6. The system of claim 5, wherein the analytic engine receives from the network gateway additional information or metadata including one or more hardware identities associated with one or more network sessions, and receives from the application processing engine additional information and metadata including one or more user credentials associated with the one or more network sessions; and
- wherein the analytic engine determines based on the additional information and metadata that multiple user devices including the first user devise of the first hardware identity are associated with a common user, or that multiple user credentials including the first user credential are associated with a common user.

7. The system of claim 5, wherein the analytic engine creates stateful network information by linking hardware identities sent from the network gateway with user credentials sent from the application processing engine, and provides based on the stateful network information a user visibility service identifying multiple user devices or multiple user credentials associated with a common user.

8. The system of claim 5, wherein the analytic engine provides a user profiling service based on the data from the network gateway and the application processing engine, the user profiling service identifies the cloud-based application services that the first user device accesses from an internal network of which the network gateway controls network traffic.

9. The system of claim 5, wherein the analytic engine receives from the network gateway a fifth message including the first hardware identity and a third tuple information of another network session traffic, and receives from the application processing engine a sixth message including a second user credential and an identity of a second cloud-based application service and the third tuple information of the other network session traffic; and
- wherein the analytic engine matches the third tuple information from both the fifth and sixth messages and creates an entry in a third stateful record database identifying that a user of the second user credential uses the first user device of the first hardware identity to access a second cloud-based application service; and wherein the analytic engine determines that the user of the second user credential is associated with the first user credential and the first user device.

10. The system of claim 5, wherein the first hardware identity of the first user device includes a Media Access Control (MAC) address, an Internet Protocol (IP) address, an IP port number, or a domain name.

11. The system of claim 5, wherein the first user credential includes a user name, a user identification number, or an email address, and the first user credential is used to authorize the network session traffic to access the first cloud-based application service.

12. The system of claim 5, wherein the first tuple information of the network session traffic includes a source IP address, a source IP port number, a destination IP address, a destination IP port number, or an identification of a network protocol of the network session traffic.

13. The system of claim 5, wherein the network gateway is a hardware networking device within an internal network that directs network traffic from devices of the internal network to cloud-based application services outside of the internal network.

14. The system of claim 5, wherein the application processing engine is a cloud service running on a cloud computing platform, and the application processing engine forwards the network session traffic to the first cloud-based application service.

15. The system of claim 5, wherein the analytic engine is a cloud service running on a cloud computing platform.

16. The system of claim 5, wherein the application processing engine and the analytic engine are two modules running on a common cloud computing platform.

17. The system of claim 5, wherein the network gateway and the application processing engine are two modules running on a common hardware network device.

18. The system of claim 5, wherein the analytic engine collects from the network gateway and the application processing engine information and metadata including: MAC addresses of devices connected to a network of the network gateway, network session data including source IP address, destination IP address, source port, destination port, and protocol, and application session data including application Domain Name System (DNS) name, application name, user name, file name, and uniform resource identifier (URI).

* * * * *